United States Patent [19]

McClain

[11] 4,446,977

[45] May 8, 1984

[54] ROLLER SUPPORT FOR LOAD HANDLING DEVICES

[75] Inventor: James L. McClain, New Orleans, La.

[73] Assignee: McDermott Incorporated, New Orleans, La.

[21] Appl. No.: 249,542

[22] Filed: Mar. 31, 1981

[51] Int. Cl.³ .............................................. B66C 23/84
[52] U.S. Cl. .................................. 212/247; 212/253; 212/190; 104/46
[58] Field of Search ................ 212/190, 223, 245–249, 212/253; 104/35–47

[56] References Cited

U.S. PATENT DOCUMENTS

| 78,553 | 6/1868 | Thompson | 104/46 |
|---|---|---|---|
| 163,033 | 5/1875 | Snyder | 104/35 |
| 356,283 | 1/1887 | Kandeler | 104/46 |
| 885,164 | 4/1908 | Magnuson | 104/46 |
| 2,071,135 | 2/1937 | McGiffert | 212/247 |
| 2,343,800 | 3/1944 | Rauch | 212/247 |
| 2,522,466 | 9/1950 | Schneider | 104/35 |
| 2,766,588 | 10/1956 | Crough | 212/190 |
| 3,338,425 | 8/1967 | Schneider et al. | 212/253 |
| 3,477,746 | 11/1969 | Watson | 212/247 |
| 3,985,406 | 10/1976 | Baron | 212/253 |
| 3,990,539 | 11/1976 | Marit | 212/247 |
| 4,065,891 | 1/1978 | Burgin | 104/46 |
| 4,271,970 | 6/1981 | Miller | 212/190 |

FOREIGN PATENT DOCUMENTS 377340  9/1907  France .................................. 104/46

OTHER PUBLICATIONS

Manitowoc, 1977, Platform-Ringer Specs, Manitowoc Engineering Co., Wisconsin.

Primary Examiner—Galen L. Barefoot
Assistant Examiner—Stephen P. Avila
Attorney, Agent, or Firm—Robert J. Edwards; Robert H. Kelly; James C. Simmons

[57] ABSTRACT

A rotary load handling device including a frame structure having an arcuate roller rail mounted on the upper surface, a roller ring having a set of concentric ring members and a plurality of double flanged wheels connected therebetween disposed on the arcuate roller rail, and an upper arcuate roller rail secured to the underside of a plate having a load handling unit mounted on the upperside of the plate whereby the upper arcuate roller rail is disposed on the roller ring and rotatable relative to the frame structure.

7 Claims, 5 Drawing Figures

ROLLER SUPPORT FOR LOAD HANDLING DEVICES

TECHNICAL FIELD

This invention relates to load handling devices and is particularly concerned with that type of load handling device incorporating a rotating base mounted on a roller support for swing motion on a barge. The invention is applicable to load handling devices of various types including cranes, shovels, draglines, and the like.

BACKGROUND OF PRIOR ART

In load handling devices adapted for shallow water barge mounted bucket dredge work, the load handling devices have generally consisted of track mounted devices operating from the deck of a barge or the upper frame or cab of a track mounted device mounted on a fixed tub on the deck of a barge. Ordinarily, whether track mounted or tub mounted on a barge, the mounting arrangement for such upper frame or cab consists of a turntable base having a plurality of house rollers and hook rollers mounted thereon and supported on a roller pad, and, if track mounted only, a shaft extending vertically downward from the cab through the turntable base to the crawler for delivering power from the power plant located on the turntable base to the crawler treads to propel the load handling device, or if tub mounted on a barge, a center pin for counteracting the turning moments resulting from loading on the extended boom. The vertically extending shaft or center pin also define the vertical axis about which the turntable base rotates. Further, such load handling devices are provided with swing mechanisms, including swing motors which are operatively connected to a swing gear by way of associated gears, transmissions, shafts, clutches, and the like to effect swing motion of the cab relative to the tracked vehicle frame or the tub.

As track mounted devices, load limits are not exceeded since the tracks will rise if a load limiting condition is reached. However, when a track mounted load handling device is mounted on a fixed tub on the deck of a barge, since the loading is outside the center of gravity of the load handling device, the design limits of the center pin, the house roller, and the hook roller are exceeded if the load limits are reached. Exceeding the design limits produces safety hazards and excessive wear not only on the center pin, house roller, and hook roller, but also on the swing mechanism, particularly, since the diameter of the house roller ring is limited by the width of the tracked vehicle frame. With such short house roller ring diameters and such extremely high load stresses prior tub mounted load handling devices either had high downtime and high maintenance costs or were heavily reinforced which added excess weight to the device thereby increasing the duty cycle of the equipment of producing excessive backlash in the swing mechanism.

In the past, the desirability to increase the house roller ring diameter necessitated machining a new plate to close tolerances and adding rollers thereto which, although, reducing stresses, did not reduce downtime due to wear on the house rollers and roller pad and, in effect, considerably increased the cost of the load handling device.

BRIEF SUMMARY OF THE INVENTION

It is an object of the present invention to provide a new and improved roller support with a swing mechanism for a load handling device mounted on a fixed tub on a barge, which is of a relatively simple design, and of low manufacturing and low maintenance cost.

Another object of the present invention is to provide a new and improved roller support with a swing mechanism for a load handling device mounted on a fixed tub on a barge whereby a reduction in wear of the bearing surfaces is obtained resulting in reduced downtime and maintenance costs.

A further object of the present invention is to provide a track mounted load handling cab with a relatively light weight, efficient and inexpensive roller support with a swing mechanism for mounting on a fixed tub on a barge.

According to one of the more specific aspects of the present invention there is provided a barge mounted rotary load handling device comprising a frame structure or tub fixed to the barge, said tub including an arcuate roller pad mounted on the upper surface of said tub, a swing gear mounted intermediate said tub about the outer periphery of said tub, and a center pin fixed to the upper surface of said tub and concentric with said arcuate roller pad and said swing gear and defining the swing axis of the load handling device, a roller ring disposed on said arcuate roller pad, said roller ring including a set of concentric ring members and a plurality of double flanged wheels operatively connected therebetween for movement on said arcuate roller pad, an upper plate means for supporting a load handling unit thereon, said upper plate means including an aperture for receiving the distal end of said center pin and an upper arcuate pad fixed to the underside of said upper plate means disposed on said roller ring, and a swing means attached to said upper plate means for rotating said upper swing means relative to said tube, said swing means including at least one swing motor and a swing pinion gear connected thereto for engagement with said swing gear for rotating said upper plate means and the rotary load handling device relative to the tub and barge.

BRIEF DESCRIPTION OF THE DRAWINGS

In the accompanying drawings, forming a part of this specification, and in which reference numerals shown in the drawings designate like or corresponding parts throughout the same.

DETAILED DESCRIPTION OF INVENTION

Figure 1:
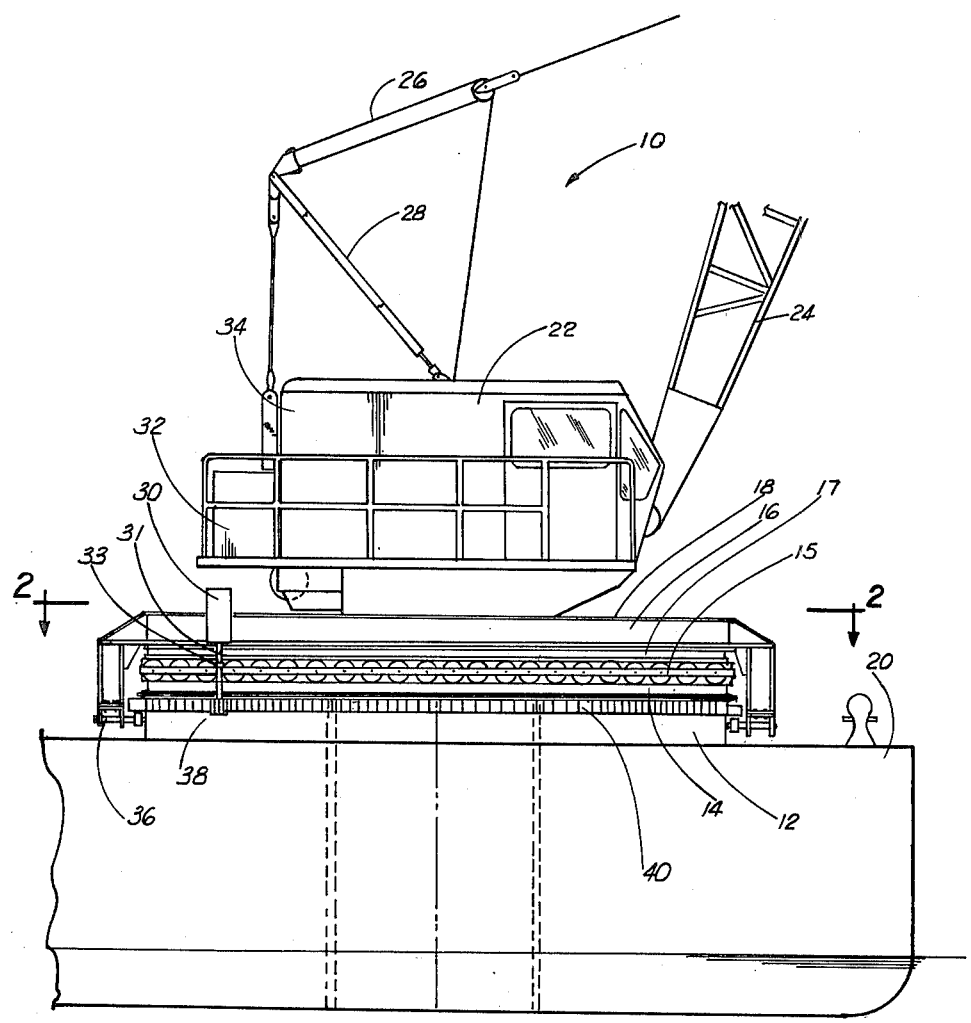
FIG. 1 is a side elevation of a barge mounted load handling device embodying the present invention.

FIG. 1 of the drawings illustrates a barge mounted load handling device or a dragline machine. The load handling device 10 generally includes a frame structure or tub 12 fixed to the barge 20, an arcuate roller pad 14 mounted on the tub and an upper plate 16 supported on the roller pad through a roller ring 15 and upper arcuate pad 17. On the upper side of the upper plate 16 is mounted an upper frame or cab 22 of a load handling device. Connected to the front end of the cab is a boom 24 which is supported at its upper end by pendants 26 secured to the upper end of a gantry 28. At the other end of the cab is a counterweight 32 and a machinery space 34. Swing motors 30 are also mounted on the upper plate for providing rotary motion, through a swing gear 40, to the load handling device relative to the barge. Also, hook rollers 36 may be mounted on the upper plate so as to engage the underside of the swing gear, or the like, to hold down the load handling device in an emergency. Mounted on the upper plate in the cab is an operator's station equipped with conventional controls for operating the dragline and swinging the load handling device.

As mentioned previously, load handling devices adapted for shallow water barge mounted bucket dredge work have generally consisted of the upper frame or cab of a track mounted device mounted on a fixed tub on the deck of a barge. The nominal size of a tub with the upper frame of a track mounted device mounted thereupon is generally eleven feet in diameter, which corresponds to the rolling circle of the house roller assemblies. Accordingly, when these upper frames are deck mounted on a tub the loading is outside the center of gravity due to the diameter of the tub. The mounting arrangement for such upper frame consists of a turntable base supported by front and rear house roller assemblies and hook rollers which engage a flat roller pad and flange, respectively. The house roller assemblies or truck units generally include a pair of large load bearing rollers each journalled on a shaft and pinned to the turntable base. Also, such load handling devices are provided with swing mechanisms including swing motors, that do not transmit power directly from the swing motors to a swing pinion, but are interconnected through torque converters transmissions, shafts and the like to drive gears which mesh with an internal swing gear to effect swing motion of the cab relative to the tub.

Figure 2:
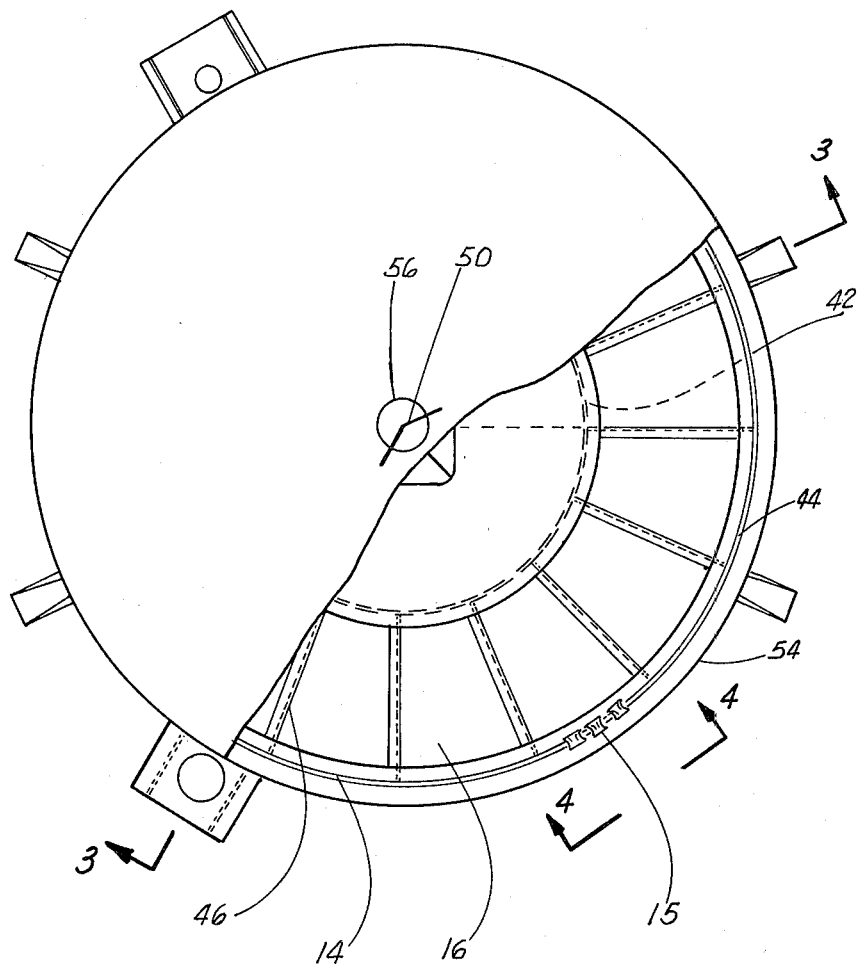
FIG. 2 is a cross-sectional view substantially taken along like 2—2 in FIG. 1, having portions broken away.
Figure 3:
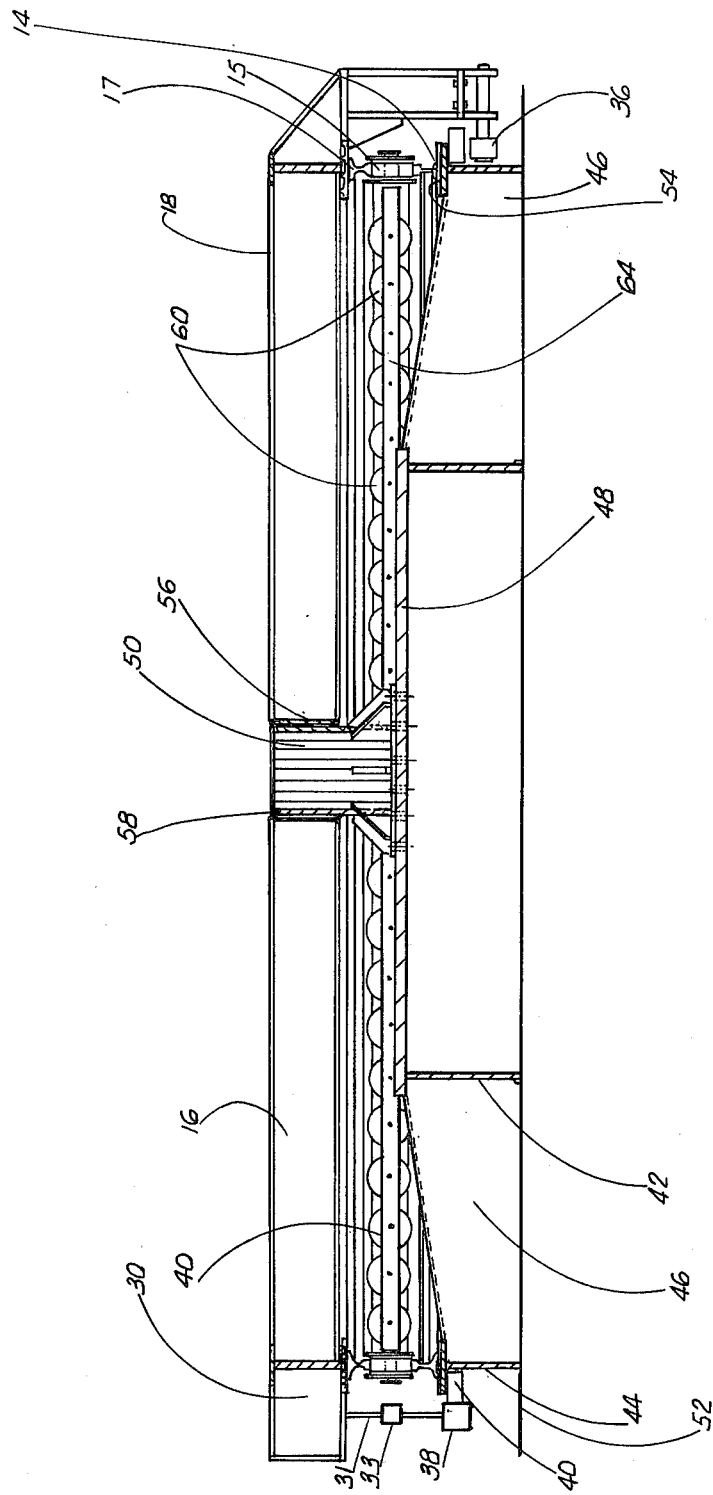
FIG. 3 is a cross-sectional view taken substantially along line 3—3 in FIG. 2, having portions broken away.

As best illustrated in FIGS. 2 and 3, the frame structure or tub 12 consists of an inner annular tub 42, which generally corresponds to the roller circle of the prior art house roller assemblies, rigidly secured to an outer annular tub 44 by interconnecting support plates 46. Disposed concentrically relative to the center of the inner tub 42 and the outer tub 44, and supported on horizontal tub plate 48, is a center pin 50. Inner tub 42 is rigidly secured to the bottom hull of the barge, while outer tub 44 is generally secured on the main deck 52 of the barge. An annular flange 54 secured to the outer tub 44 forms a circular horizontal path for mounting the arcuate roller pad 14 thereto. The arcuate roller pad is generally a railroad rail, for example 100 pound A.S.C.E. rail. Generally, the tubs, plates, flanges, and the like are formed of steel and are rigidly secured together by welding or the like. Also disposed on the outer periphery of the outer annular tub 44 is swing gear 40. This outer swing gear generally consists of a plurality of arcuate segments disposed in end to end relation and are flame cut, a technique which has previously been unsuccessful in maintaining concentricity and has produced excessive backlash on the driving pinion gear.

The upper plate 16 includes a vertical aperture 56 adapted to be aligned with and receive the center pin 50. A bushing 58 is spaced between the aperture and the center pin and may be formed of bronze.

Swing motors 30, generally hydraulic motors, are mounted on the upper plate 16 to provide for rotating the load handling device about the center pin 50. Referring to FIG. 2, it will be noted that two swing motors are illustrated, although one such motor is capable of revolving the load handling device. The swing motors include a vertically disposed shaft 31 to which is directly mounted a swing pinion gear 38 near the bottom of the shaft and a disc brake 33 intermediate the shaft. As a consequence of this direct drive arrangement, the transmission, gearing, and the like required for mechanical swingers is eliminated. The swing pinion gear 38 engages with the swing gear 40 to provide either clockwise or counterclockwise rotation of the load handling device.

Figure 4:
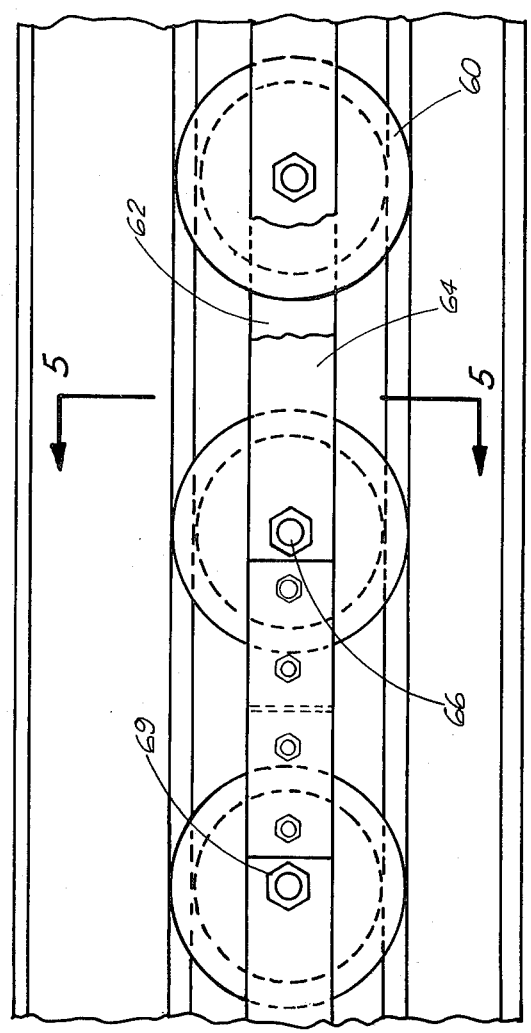
FIG. 4 is a cross-sectional view taken substantially along line 4—4 in FIG. 2, having portions broken away.
Figure 5:
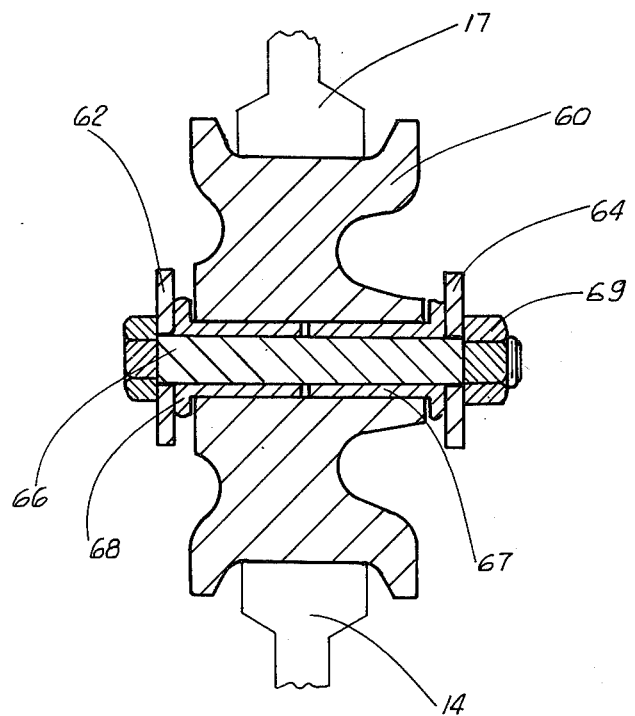
FIG. 5 is an enlarged cross-sectional view taken substantially along line 5—5 in FIG. 4.

FIGS. 4 and 5 illustrate in detail the roller ring 15 which is mounted on the arcuate roller pad 14 and which supports the upper plate 16 through upper arcuate pad 17 which is generally similar to arcuate roller pad 14. The roller ring 15 includes an inner ring member 62 and an outer ring member 64, concentric with the center pin 50, and having a plurality of shafts 66 transversely disposed therebetween. Carried on each shaft 66 and journalled by bushings 67, 68, is a wheel 60, secured thereto by fastners 69. Preferably, wheel 60 consists of a double flanged steel wheel railroad wheel.

Operation of parts described will be readily apparent to those skilled in the art. Under normal dragline operation, the roller ring 15 is in rotatable engagement with both the arcuate roller pad 14 and the upper arcuate pad 17. By controlling the swing motors 30 the load handling device can rotate in either clockwise or counterclockwise direction in relation to the tub 12.

I claim:

1. In apparatus mounted on a barge for rotatably supporting a load handling device, the apparatus including a first frame structure rigidly secured to a bottom hull of the barge for supporting a plate means for supporting a load handling device thereon, and a vertically oriented center pin rigidly connected at its lower end to said first frame structure and the upper end of which is insertable in an aperture in the plate means to define a vertical axis for rotation of the plate means, the improvement in the apparatus comprises means including said plate means the diameter of which is greater than the first frame structure diameter and including a second frame structure secured to a deck of the barge and disposed outwardly of and rigidly secured to said first frame structure for effecting an increased diameter roller ring for reducing load stresses thereon, a lower roller pad rigidly mounted on an upper surface of said second frame structure and concentric with said center pin, an upper roller pad rigidly mounted on a lower surface of said plate means and concentric with said center pin, a roller ring including a pair of concentric ring members and a plurality of wheel means connected to and disposed between said ring members and engaging both said upper and lower roller pads for rotational movement of said plate means relative to said first and second frame structures, a swing gear fixed to said second frame structure about the outer periphery thereof, a pinion gear for engaging said swing gear, and means rigidly connected to said plate means for rotating said pinion gear to thereby rotate said plate means relative to said first and second frame structures.

2. Apparatus as defined in claim 1 wherein said pinion gear rotating means comprises a motor which is connected directly to said pinion gear.

3. Apparatus as defined in claim 1 further including a plurality of hook rollers disposed on said plate means so as to hang beneath the underside of said swing gear for engagement with said swing gear in the event of failure of said center pin.

4. Apparatus as defined in claim 1 wherein said wheel means is a double flanged wheel.

5. Apparatus as defined in claim 1 wherein said lower and said upper roller pads are railroad rails.

6. Apparatus as defined in claim 2 wherein said motor is a hydraulic motor.

7. A method for reducing load stresses on a roller ring and plate means supporting a load handling device in apparatus which is mounted on a barge and which has a first frame structure rigidly secured to a bottom hull of the barge and a vertically oriented center pin rigidly connected at its lower end to the first frame structure and the upper end of which is insertable in an aperture in a plate means for rotation of the plate means, the method comprises disposing a second frame structure outwardly of the first frame structure, rigidly securing the second frame structure to a deck of the barge and to the first frame structure, rigidly mounting a lower roller pad on an upper surface of the second frame structure and concentric with the center pin, providing said plate means with a diameter greater than the first frame structure diameter and which has an aperture for insertion of the center pin upper end, rigidly mounting an upper roller pad on a lower surface of the plate means and concentric with the center pin, disposing a roller ring including a pair of concentric ring members and a plurality of wheel means connected to and disposed between the ring members to engage both upper and lower roller pads for effecting rotational movement of the plate means relative to the first and second frame structures, disposing a swing gear to engage the second frame structure about the outer periphery thereof, disposing a pinion gear to engage the swing gear, and rigidly connecting to the plate means pinion gear rotating means for rotating the plate means relative to the first and second frame structures.

* * * * *